US011254356B2

(12) United States Patent
Kato

(10) Patent No.: US 11,254,356 B2
(45) Date of Patent: Feb. 22, 2022

(54) VEHICLE CONTROL SYSTEM

(71) Applicant: TOYOTA JIDOSHA KABUSHIKI KAISHA, Toyota (JP)

(72) Inventor: Masaya Kato, Toyokawa (JP)

(73) Assignee: TOYOTA JIDOSHA KABUSHIKI KAISHA, Toyota ( * ) Notice: Subject to any disclaimer, the term of this patent is extended or adjusted under 35 U.S.C. 154(b) by 71 days.

(21) Appl. No.: 16/743,672

(22) Filed: Jan. 15, 2020

(65) Prior Publication Data

US 2020/0239066 A1 Jul. 30, 2020

(30) Foreign Application Priority Data

Jan. 25, 2019 (JP) .............................. JP2019-011312

(51) Int. Cl.
*B60W 10/20* (2006.01)
*B62D 5/04* (2006.01)

(52) U.S. Cl.
CPC ........... *B62D 5/0463* (2013.01); *B60W 10/20* (2013.01); *B62D 5/0466* (2013.01); *B62D 5/0496* (2013.01)

(58) Field of Classification Search
CPC .. B62D 5/0463; B62D 5/0496; B62D 5/0466; B62D 5/046; B60W 10/20
See application file for complete search history.

(56) References Cited

U.S. PATENT DOCUMENTS 4,591,014 A * 5/1986 Yasuda ................ B62D 5/0481
180/446

4,771,845 A * 9/1988 Shimizu ............... B62D 5/0463
180/446

(Continued)

FOREIGN PATENT DOCUMENTS

JP 2001-341661 A 12/2001
JP 2011-201366 A * 10/2011
(Continued)

OTHER PUBLICATIONS

"Development of active steering angle control based on electric power steering systems;" Jin-Yan Hsu, Chih-Jung Yeh, Tsung-Hsien Hu, Tsung-Hua Hsu, Fu-Hsien Sun; 2011 IEEE Vehicle Power and Propulsion Conference; Sep. 1, 2011.*

(Continued)

*Primary Examiner* — Khoi H Tran
*Assistant Examiner* — Jorge O Peche
(74) *Attorney, Agent, or Firm* — Sughrue Mion, PLLC

(57) ABSTRACT

The vehicle control system is applied as a system of a vehicle mounted with an EPS device having an electric motor driven to control the steering angle. The vehicle control system includes a controller configured to perform steering control for controlling an energization of the electric motor to control the steering angle of the wheels. When the wheels are held after being steered by a specific steering in the steering control, the controller performs a steering return process in which the wheels are turned back and held in a direction opposite to a steering direction of the specific steering. And during a stationary steering-holding in which the steering angle is held and the vehicle is stopped, the controller performs an energization suppression process for reducing energization to the electric motor to be smaller than the energization before the stationary steering-holding.

7 Claims, 7 Drawing Sheets

(56) References Cited

U.S. PATENT DOCUMENTS

| | | | | | |
|---|---|---|---|---|---|
| 4,789,040 | A | * | 12/1988 | Morishita | B62D 5/0496 180/446 |
| 5,295,550 | A | * | 3/1994 | Chikuma | B62D 6/02 180/412 |
| 5,325,935 | A | * | 7/1994 | Hirooka | B62D 7/142 180/211 |
| 5,398,953 | A | * | 3/1995 | Shimizu | B62D 5/0463 180/446 |
| 5,732,791 | A | * | 3/1998 | Pinkos | B62D 5/0439 180/444 |
| 5,762,159 | A | * | 6/1998 | Matsuoka | B62D 5/065 180/417 |
| 6,334,503 | B1 | | 1/2002 | Fukumura | B62D 5/046 180/443 |
| 6,389,342 | B1 | * | 5/2002 | Kanda | B62D 5/006 180/443 |
| 6,731,040 | B1 | * | 5/2004 | Tanaka | H01R 4/025 310/233 |
| 10,351,162 | B1 | * | 7/2019 | Katzourakis | B62D 5/0475 |
| 2002/0005314 | A1 | * | 1/2002 | Takehara | B62D 5/0463 180/443 |
| 2003/0094329 | A1 | * | 5/2003 | Ogawa | B62D 5/008 180/444 |
| 2003/0193305 | A1 | * | 10/2003 | Crowley | B62D 5/0481 318/432 |
| 2005/0067210 | A1 | * | 3/2005 | Hayashi | B62D 6/007 180/272 |
| 2005/0166993 | A1 | * | 8/2005 | Viken | F01M 11/0458 141/98 |
| 2006/0090954 | A1 | * | 5/2006 | Sugitani | B62D 5/006 180/446 |
| 2007/0000718 | A1 | * | 1/2007 | Sawano | B62D 5/0484 180/446 |
| 2007/0193817 | A1 | * | 8/2007 | Kogel | B62D 5/065 180/421 |
| 2007/0242398 | A1 | * | 10/2007 | Ogawa | B62D 5/0463 361/33 |
| 2008/0024080 | A1 | * | 1/2008 | Ogawa | B62D 5/04 318/432 |
| 2009/0240389 | A1 | * | 9/2009 | Nomura | H02P 6/16 701/31.4 |
| 2011/0101904 | A1 | * | 5/2011 | Sakamoto | B60L 3/0061 318/473 |
| 2011/0178681 | A1 | * | 7/2011 | Gu | B62D 5/0496 701/42 |
| 2013/0062137 | A1 | * | 3/2013 | Motoda | H02K 11/33 180/446 |
| 2013/0066524 | A1 | * | 3/2013 | Kitazume | B62D 5/046 701/42 |
| 2013/0088128 | A1 | * | 4/2013 | Nakano | H05K 7/2039 310/68 R |
| 2013/0124045 | A1 | * | 5/2013 | Suzuki | B62D 7/159 701/41 |
| 2015/0025744 | A1 | * | 1/2015 | Banno | B62D 6/04 701/41 |
| 2015/0134201 | A1 | * | 5/2015 | Lavoie | B62D 9/00 701/41 |
| 2017/0021859 | A1 | * | 1/2017 | Kodera | B62D 5/001 |
| 2017/0297613 | A1 | * | 10/2017 | Sakaguchi | B62D 6/08 |
| 2017/0327144 | A1 | * | 11/2017 | Sakaguchi | B62D 5/0463 |
| 2017/0334481 | A1 | * | 11/2017 | Sakaguchi | B62D 5/0469 |
| 2018/0015946 | A1 | * | 1/2018 | Kodera | B62D 6/10 |
| 2018/0093701 | A1 | * | 4/2018 | Kodera | B62D 5/0478 |
| 2018/0186406 | A1 | * | 7/2018 | Itou | B62D 6/005 |
| 2018/0297629 | A1 | * | 10/2018 | Wang | B62D 5/0424 |
| 2018/0297631 | A1 | * | 10/2018 | Miyatani | B62D 5/0484 |
| 2019/0176878 | A1 | * | 6/2019 | Lee | H02P 29/40 |
| 2019/0233001 | A1 | * | 8/2019 | Namikawa | B62D 6/002 |
| 2019/0276072 | A1 | * | 9/2019 | Morimoto | H01G 9/26 |
| 2019/0331544 | A1 | * | 10/2019 | Kojo | B62D 15/025 |
| 2019/0367074 | A1 | * | 12/2019 | Engels | B62D 5/0421 |
| 2020/0124864 | A1 | * | 4/2020 | Rothberg | G02B 27/0972 |
| 2020/0398893 | A1 | * | 12/2020 | Shoji | B62D 15/021 |

FOREIGN PATENT DOCUMENTS

| | | | | |
|---|---|---|---|---|
| JP | 2014-125038 | A | * | 4/2014 |
| JP | 2014-136430 | A | * | 4/2014 |
| JP | 2015-13498 | A | | 1/2015 |

OTHER PUBLICATIONS

"Robust Control of Electric Power Steering System;" Qing Liu, Hui Chen, Hongyun Zheng; IECON 2007—33rd Annual Conference of the IEEE Industrial Electronics Society (pp. 874-879); Apr. 14, 2008.*

* cited by examiner

VEHICLE CONTROL SYSTEM

CROSS-REFERENCE TO RELATED APPLICATION

The present application is based on, and claims priority from, Japanese Patent Application Serial Number 2019-011312, filed on Jan. 25, 2019, the disclosure of which is hereby incorporated by reference herein in its entirety.

FIELD

The present disclosure relates to a vehicle control system, and more particularly, to a vehicle control system for controlling a steering angle of wheels using an electric power steering apparatus.

BACKGROUND

Japanese Patent Application Laid-Open No. 2001-341661 discloses a technique relating to an electric power steering apparatus for providing a steering assist force to a steering mechanism by an electric motor. The electric power steering apparatus of this technology includes a current supply device for supplying a current corresponding to a steering signal such as a steering torque or a vehicle speed to an electric motor for generating a steering assist torque, and an energization limiting device for limiting an energizable current according to an energization current and reducing an energization current corresponding to the steering torque. According to such a device, since a higher steering assist force can be supplied for a long time, the supply of the energization current can be maintained for a long time.

SUMMARY

When the steering angle of a vehicle equipped with an electric power steering device (EPS device) is maintained, it is necessary to continuously supply current to the EPS device. At this time, if the torsion between the road surface and the wheel is large, a large current must continue to flow to the EPS system, and heat generation of the EPS device may become a question. On the other hand, when the steering angle of the vehicle is held, if the current to the EPS device is cut off, the actual steering angle of the vehicle may deviate from the target holding steering angle.

The present disclosure has been made in view of the above-mentioned problems, and an object thereof is to provide a vehicle control system capable of suppressing heat generation of a power steering apparatus when maintaining a steering angle of wheels in a vehicle in which an electric power steering apparatus is mounted.

In order to solve the above-mentioned problems, the first disclosure is applied to a vehicle control system of a vehicle in which an electric power steering apparatus having an electric motor driven to control a steering angle of a wheel is mounted. The vehicle control system includes a controller configured to perform steering control for controlling an energization of the electric motor to control the steering angle of the wheels. The controller is configured to, when the wheels are held after being steered by a specific steering in the steering control, perform a steering return process in which the wheels are turned back and held in a direction opposite to a steering direction of the specific steering. And the controller is configured to, during a stationary steering-holding in which the steering angle is held and the vehicle is stopped, perform an energization suppression process for reducing energization to the electric motor to be smaller than the energization before the stationary steering-holding.

The second disclosure has the following further features in the first disclosure.

The specific steering is a stationary steering that performs steering in a state in which the vehicle is stopped.

The third disclosure has the following further features in the first or second disclosure.

The controller is configured to stop the energization suppression process when the vehicle starts traveling during the energization suppression process.

The fourth disclosure has the following features in any one of the first to third disclosures.

The steering control is configured to control energization of the electric motor to bring an actual steering angle of the wheels closer to a required steering angle. The steering return process is configured to control energization of the electric motor so that the actual steering angle returns to the required steering angle after overshooting the required steering angle in the process of holding the actual steering angle at the required steering angle.

The fifth disclose has the following features in any one of the first to third disclosures.

The steering control is configured to control the energization of the electric motor to bring the actual steering angle of the wheel closer to the required steering angle. The steering return process is configured to control the energization of the electric motor so that the wheels are turned back and held in a direction opposite to the steering direction toward the required steering angle in the process of bringing the actual steering angle closer to the required steering angle.

The sixth disclose has the following features in the fourth or fifth disclosure.

The controller is configured to execute a process of calculating the required steering angle from the steering operation amount of the driver.

The seventh disclose has the following features in the fourth or fifth disclosure.

The controller is configured to execute a process of, acquiring a planned route to a target position, and calculating a steering angle for the vehicle to follow the planned route as the required steering angle.

The eighth disclose has the following features in any one of the first to seventh disclosures.

The controller is configured to execute a temperature detection process for detecting a temperature of the electric power steering apparatus, and a prohibition process for prohibiting execution of the energization suppression process when a temperature detected by the temperature detection process is lower than a predetermined determination temperature.

According to the control device of the first disclosure, when the wheel is held after being steered by the specific steering, the steering angle is held after the wheel is turned back in a direction opposite to the steering direction of the specific steering. According to such an operation, since the torsion of the wheel and the road surface reaction force can be eliminated, the steering axial force is lowered. As a result, it is possible to reduce the current to the electric power steering apparatus while holding the steering angle, and therefore it is possible to suppress the heat generation of the electric power steering apparatus when holding the steering angle of the wheel.

According to the second disclosure, when the steering angle is held after the stationary steering, the steering return process is performed. In the stationary steering, the torsion of the wheel after the steering and the road surface reaction force are larger than in the moving steering (clothoid steering). In addition, it is difficult to be affected by the behavior change of the vehicle while the vehicle is stopped. Therefore, according to the present disclosure, it is possible to effectively suppress the heat generation of the electric power steering apparatus while suppressing the influence of the behavior change of the vehicle.

According to the third disclosure, continuation of the energization suppression process can be prevented even when the vehicle starts traveling. As a result, it is possible to prevent a problem in steering after the vehicle travels.

According to the fourth disclosure, it is possible to keep the steering angle close to the required steering angle after the process of switching back the steering of the wheel is performed. This makes it possible to suppress heat generation of the electric power steering apparatus while maintaining the steering angle at the required steering angle.

According to the fifth disclose, in the process of bringing the actual steering angle closer to the required steering angle, the process of switching back the steering of the wheels is performed. This makes it possible to suppress heat generation of the electric power steering apparatus while holding the steering angle in a state where the steering angle is steered in the vicinity of the required steering angle.

According to the sixth disclose, the required steering angle is calculated from the steering operation amount of the driver. This makes it possible to perform steering control in accordance with the operation of the driver.

According to the seventh disclose, the required steering angle for the vehicle to follow the planned route to the target position is calculated. This makes it possible to suppress the heat generation of the electric power steering apparatus in the process of accurately guiding the vehicle to the target position.

According to the eighth disclose, when the temperature of the electric power steering apparatus is lower than the determination temperature, the energization suppression process is prohibited. According to such processing, it is possible to prevent the execution of the energization suppression processing when the heat generation of the electric power steering apparatus does not cause a question.

DETAILED DESCRIPTION

Hereinafter, embodiments of the present disclosure will be described with reference to the accompanying drawings.

However, it is to be understood that even when the number, quantity, amount, range or other numerical attribute of each element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly described otherwise, or unless the present disclosure is explicitly specified by the structures, steps or the like theoretically.

Figure 1:
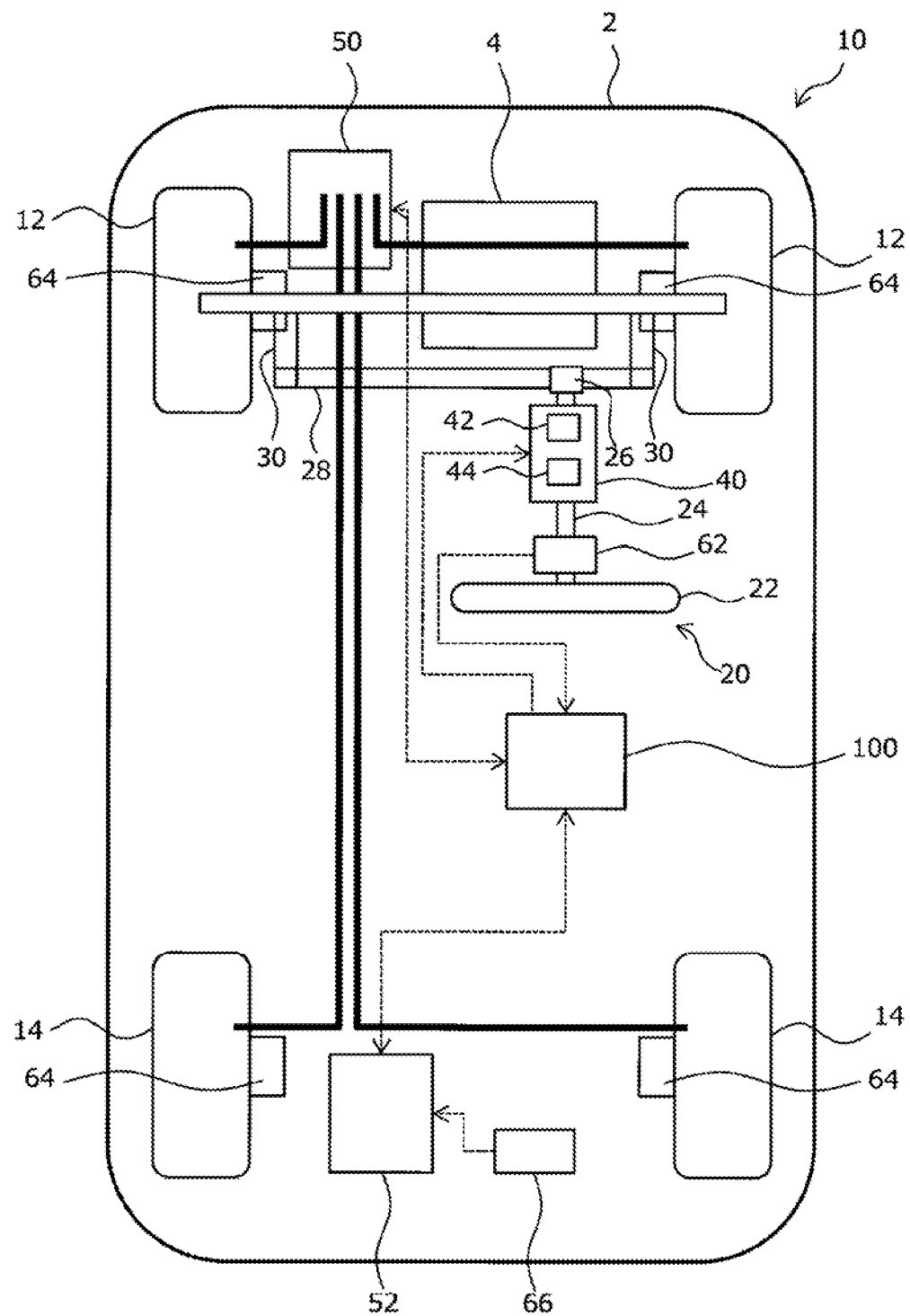
FIG. 1 is a schematic diagram showing a configuration example of a vehicle to which a vehicle control system according to a first embodiment is applied.

First Embodiment 1-1. Configuration Example of Vehicle Having Driving Support Apparatus FIG. 1 is a schematic diagram showing a configuration example of a vehicle to which a vehicle control system according to a first embodiment of the present disclosure is applied. A vehicle control system 10 is mounted on a vehicle 2 and performs steering control to support steering of the vehicle 2. In the following description, a specific steering for steering the wheels while the vehicle 2 is stopped is referred to as "stationary steering", and a specific steering for steering the wheels while the vehicle 2 is moving is referred to as "moving steering". Further, maintaining a steering angle of the vehicle 2 at a constant steering angle is referred to as "steering-holding", and the steering-holding while the vehicle 2 is stopped is referred to as "stationary steering-holding".

As shown in FIG. 1, the vehicle 2 of the present embodiment includes an engine 4, two front wheels 12, two rear wheels 14, a steering apparatus 20, a controller 100 of the steering apparatus 20, a brake device 50, and a driving support system electronic control unit (ECU) 52. The engine 4 includes an engine body and an engine electronic control unit (ECU) for controlling the engine body. The brake device 50 includes a brake actuator and a brake electronic control unit (ECU) for controlling the brake actuator.

The steering apparatus 20 is an apparatus that steers the two front wheels 12. Specifically, the steering apparatus 20 includes a steering wheel 22, a steering shaft 24, a pinion gear 26, a rack bar 28, tie rods 30, and an electric power steering (EPS) device 40. The driving support apparatus of the present embodiment can be similarly applied to a vehicle in which both the front wheels 12 and the rear wheels 14 are steered (so-called 4WS (4 Wheel Steering) vehicle).

The steering wheel 22 is used for steering operation by the driver. That is, when it is desired to steer the front wheels 12, the driver rotates the steering wheel 22. The steering shaft 24 is connected to the steering wheel 22. The other end of the steering shaft 24 is connected to the pinion gear 26. The pinion gear 26 meshes with the rack bar 28. Both ends of the rack bar 28 are connected to the left and right front wheels 12 via the tie rods 30. The rotation of the steering wheel 22 is transmitted to the pinion gear 26 via the steering shaft 24. The rotational movement of the pinion gear 26 is converted into a linear movement of the rack bar 28, thereby changing the steering angle of the front wheels 12.

The EPS device 40 is a device for generating a force to steer the front wheel 12. More specifically, the EPS device 40 includes an electric motor 42 as an EPS actuator and an EPS driver 44. As an example, the electric motor 42 is connected to the rack bar 28 via a conversion mechanism (not shown). The conversion mechanism is, for example, a ball screw. When the rotor of the electric motor 42 rotates, the conversion mechanism converts the rotational motion into a linear motion of the rack bar 28. As a result, the steering angle of the front wheels 12 changes.

The EPS driver 44 is a device for driving the electric motor 42, and includes an inverter. The inverter converts DC power supplied from a DC power source (not shown) into AC power, supplies the AC power to the electric motor 42, and drives the electric motor 42. The EPS driver 44 controls the rotation of the electric motor 42, whereby the front wheel 12 can be steered. The operation of the EPS driver 44, that is, the operation of the EPS device 40, is controlled by a controller 100, which will be described later. The control of the EPS device 40 by the controller 100 will be described in detail later.

A controller 100 for controlling the EPS device 40 is mounted on the vehicle 2. The controller 100 is also referred to as an EPS electronic control unit (ECU) 100. The controller 100 includes a processor, a memory, and an input/output interface. Various sensors and various ECUs for detecting various state quantities of the vehicle 2 are electrically connected to the controller 100. The input/output interface receives sensor signals from the various sensors described above, and also receives various types of data from the brake ECU of the brake device 50 and the driving support system ECU 52.

The various sensors include, by way of example, a steering angle sensor 62 and a wheel speed sensor 64. The steering angle sensor 62 detects the rotation angle of the steering shaft 24. This rotation angle is the same as the steering angle of the steering wheel 22. The steering angle sensor 62 outputs a steering angle signal corresponding to the rotation angle to the controller 100. There is a correlation between the steering angle of the steering wheel 22 and the steering angle of the front wheels 12. Therefore, by defining the relationship between the two, it is possible to calculate the actual steering angle of the front wheels 12 as a value corresponding to the rotation angle detected by the steering angle sensor 62. The actual steering angle may be configured to directly detect the steering angle of the front wheels 12 by the steering angle sensor.

The wheel speed sensor 64 is provided on each of the right and left front wheels 12 and the right and left rear wheels 14 of the vehicle. The wheel speed sensor 64 detects the rotational speed of each wheel, and outputs a signal corresponding to the rotational speed to the controller 100. The controller 100 executes various types of operation control related to the operation of the vehicle 2. One of the driving controls of the controller 100 is the steering control of the front wheels 12 performed using the EPS device 40.

The vehicle 2 is equipped with a driving environment detection device 66. The driving environment detection device 66 acquires "driving environment information" used for detecting a driving lane in which the vehicle 2 travels in automated driving control of the vehicle 2, which will be described later. The driving environment information includes peripheral target information relating to target objects in the vicinity of the vehicle 2. The peripheral target includes a moving target and a stationary target. Examples of the moving target include a surrounding vehicle and a pedestrian. The information about the moving target include position and velocity of the moving target. Examples of the stationary target include roadside objects and white lines. The information about the stationary target includes a position of the stationary target.

The driving environment detection device 66 includes, for example, a stereo camera that captures an image of the surrounding circumstance of the vehicle 2 in order to detect the peripheral target information. The image captured by the stereo camera is transmitted as image data to the driving support system ECU 52 at any time. The transmitted image data is subjected to image processing by the driving support system ECU 52. As a result, the driving support system ECU 52 can detect the driving lane of the vehicle 2 based on the white line included in the image data. For example, at least one of a LIDAR: Laser Imaging Detection and Ranging and a millimeter-wave radar may be used instead of or together with the stereo camera to detect the peripheral target information. The LIDAR detects a target in the vicinity of the vehicle 2 by using light. The millimeter-wave radar detects a target in the vicinity of the vehicle 2 by using radio waves.

Further, the position and orientation information of the vehicle 2 may be used as the driving environment information for detecting the driving lane of the vehicle 2 in place of or together with the peripheral target information. The position and orientation information may be acquired using, for example, a GPS (Global Positioning System) device. The GPS device receives signals transmitted from a plurality of GPS satellites, and calculates the position and orientation of the vehicle 2 based on the received signals. The GPS device transmits the calculated position and orientation information to the driving support system ECU 52.

The driving environment information for automated driving control further includes lane information, infrastructure providing information, and the like. In order to automatically perform lane changes, the driving environment detection device 66 may include a map database for obtaining lane information and may include a communication device for obtaining infrastructure provision information. Lane information indicating the layout of each lane on the map is recorded in the map database. Based on the map database and the position of the vehicle 2, lane information around the vehicle 2 may be acquired. The communication device acquires the infrastructure provision information from the information providing system. Infrastructure provision information includes traffic congestion information, construction section information, and the like. If a communication device is provided, such infrastructural information is transmitted to the driving support system ECU 52.

The driving support system ECU 52 executes various types of driving control related to the driving of the vehicle 2. The driving control of the driving support system ECU 52 includes automated driving control for controlling automated driving including automated parking of the vehicles 2. In the automated driving control, the driving support system ECU 52 generate a planned route for moving the vehicles 2 to a target position. The planned route includes control patterns relating to driving, braking, and steering for the vehicle 2 to follow the planned route. The driving support system ECU 52 send control patterns to the engine ECU, brake ECU, and controller 100 described above. Each ECU controls the actuator in accordance with the sent control pattern.

Figure 2:
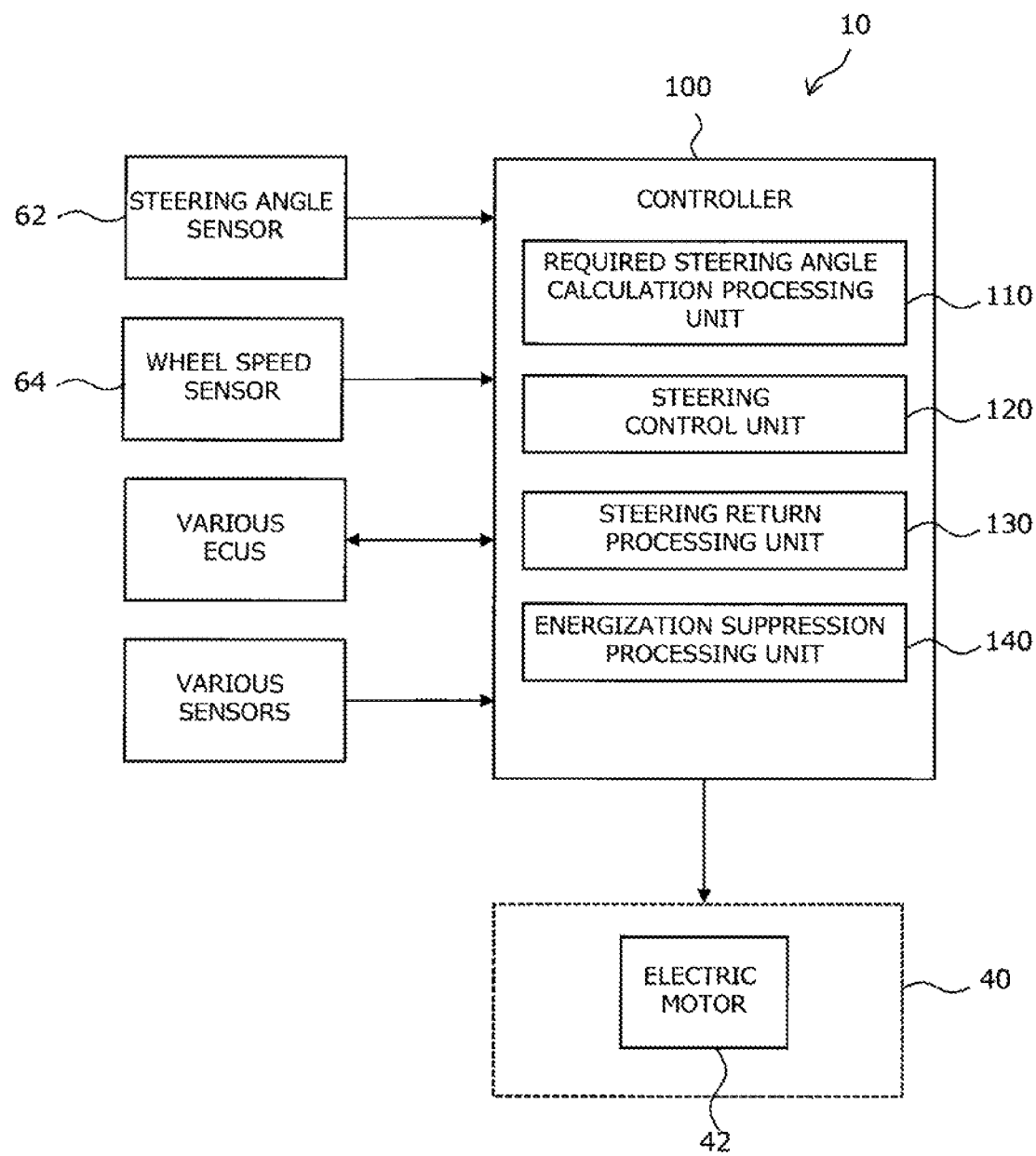
FIG. 2 is a block diagram showing a functional configuration of a controller for steering control using an EPS device.

FIG. 2 is a block diagram showing a functional configuration of a controller for steering control using the EPS device. The controller 100 includes, as functional blocks related to steering control using the EPS device 40, a required steering angle calculation processing unit 110 that performs required steering angle calculation process, a steering control unit 120 that performs steering control, a steering return processing unit 130 that performs steering return process, and an energization suppression processing unit 140 that performs energization suppression process.

The required steering angle calculation process is a process for calculating a required steering angle of the vehicle 2. When the vehicle 2 is being steered by the operation of the steering wheel 22 by the driver, the required steering angle calculation processing unit 110 calculates the required steering angle based on a steering operation amount detected by the steering angle sensor 62. When the vehicle 2 is automatically driven along the set planned route, the required steering angle calculation processing unit 110 calculates the required steering angle for the vehicle 2 to follow the planned route.

The steering control is a process of operating the EPS device 40 so that the actual steering angle of the vehicle 2 approaches the required steering angle. The steering control unit 120 controls the operation of the EPS driver 44 of the EPS device 40 to control the electric motor 42.

The steering return process is a process of turning back and holding the steering angle in a direction opposite to the steering direction when the steering angle is held after the steering of the vehicle 2. The specific process executed by the steering return processing unit 130 will be described in detail later.

The energization suppression process is a process of reducing the energization of the electric motor 42 of the EPS device 40 while the stationary steering-holding of the vehicle 2 is performed, compared to before the steering-holding. Specific process executed by the energization suppression processing unit 140 will be described later in detail.

The functional blocks shown in FIG. 2 are realized by the processor of the controller 100 executing the control program stored in the memory based on the detection information of the various sensors described above. The controller 100 including the required steering angle calculation processing unit 110, the steering control unit 120, the steering return processing unit 130, and the energization suppression processing unit 140 does not necessarily have to be configured as a single controller. That is, these functional blocks may be configured as separate controllers.

1-2. Outline of Steering Control of First Embodiment

Figure 3:
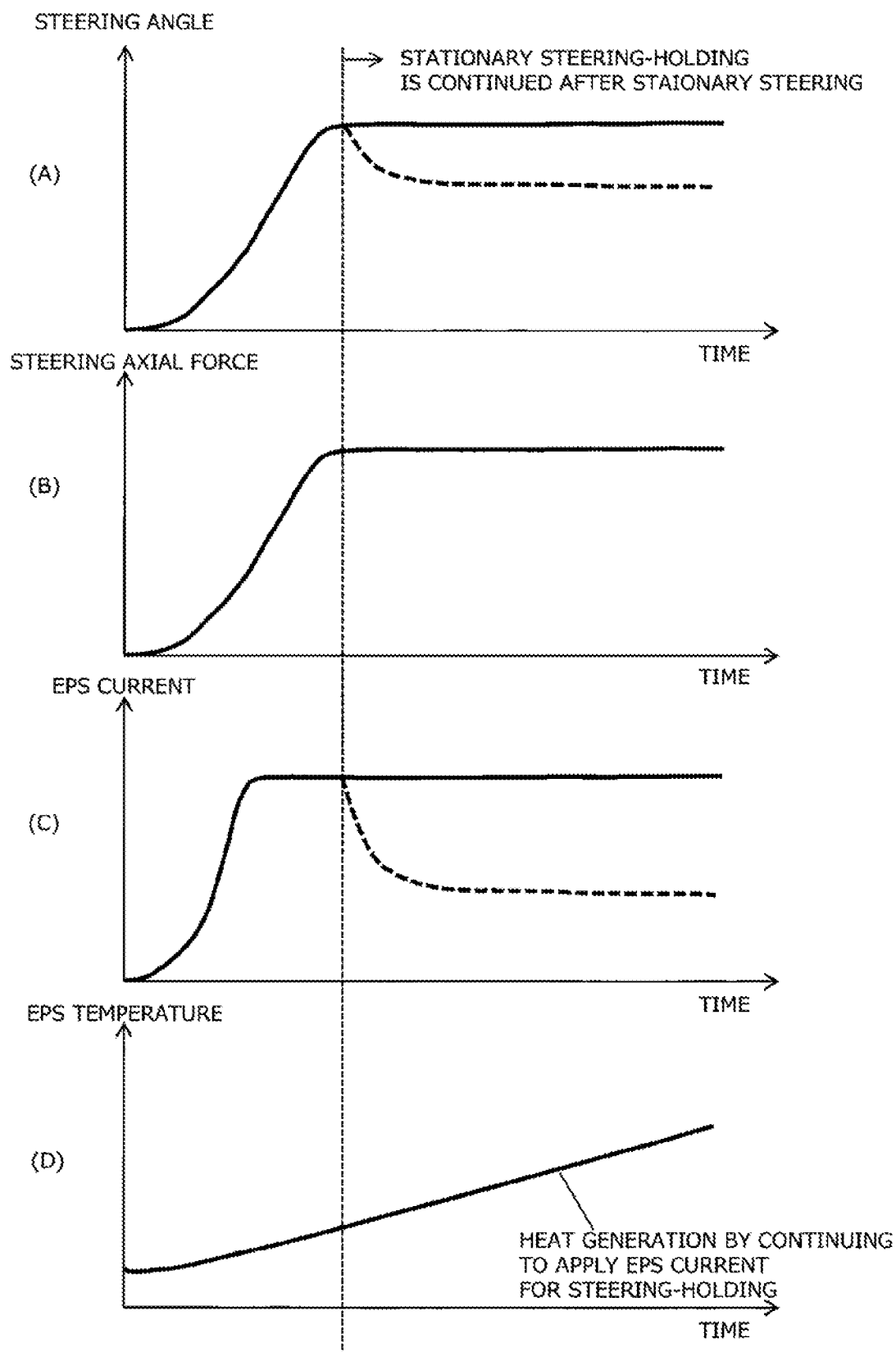
FIG. 3 is a conceptual diagram for explaining steering control as a comparative example.

FIG. 3 is a conceptual diagram for explaining steering control as a comparative example. In the steering control of this comparative example, the operation is exemplified in which the stationary steering is performed until time t1, and thereafter the stationary steering-holding is continued. As shown by the solid line in the time charts (A) and (B) of FIG. 3, when the stationary steering is performed, the road surface reaction force applied to the wheel (tire) and the torsion of the wheel increase with an increase in the steering angle. For this reason, the steering axial force, which is the axial force required for steering, increases with an increase in the steering angle, and is maintained at an increased value even during the continuation of the stationary steering-holding.

The time chart (C) of FIG. 3 shows a temporal change of the EPS current, which is a value of a current to be supplied to the electric motor 42 of the EPS device 40. As shown by the solid line in this time chart, since the EPS current increases with the increase of the steering shaft force, the EPS current is maintained at a high value even while the stationary steering-holding is continued. Therefore, as shown in the time chart (D) of FIG. 3, the temperature (EPS temperature) of the EPS device 40 rises with time by continuing to apply a high EPS current. When the EPS temperature reaches the upper limit of the temperature constraint, it becomes difficult to continue the steering control by the EPS device 40.

Here, as a countermeasure against the above-mentioned problem, as shown by a chain line in the time chart (C) of FIG. 3, it is considered that the EPS current is lowered while the stationary steering-holding is continued. However, if the EPS current is lowered, the steering angle is returned by the reaction force to the steering shaft force as shown by the chain line in the time chart (A) of FIG. 3, and the target steering angle may not be maintained. As described above, in the steering control of the comparative example, there is a problem in the heat generation of the EPS device 40 at the time of maintaining the steering angle after the steering. This is not limited to the case of the stationary steering, but also applies to, for example, the case of the moving steering at low speed (clothoid steering).

Figure 4:
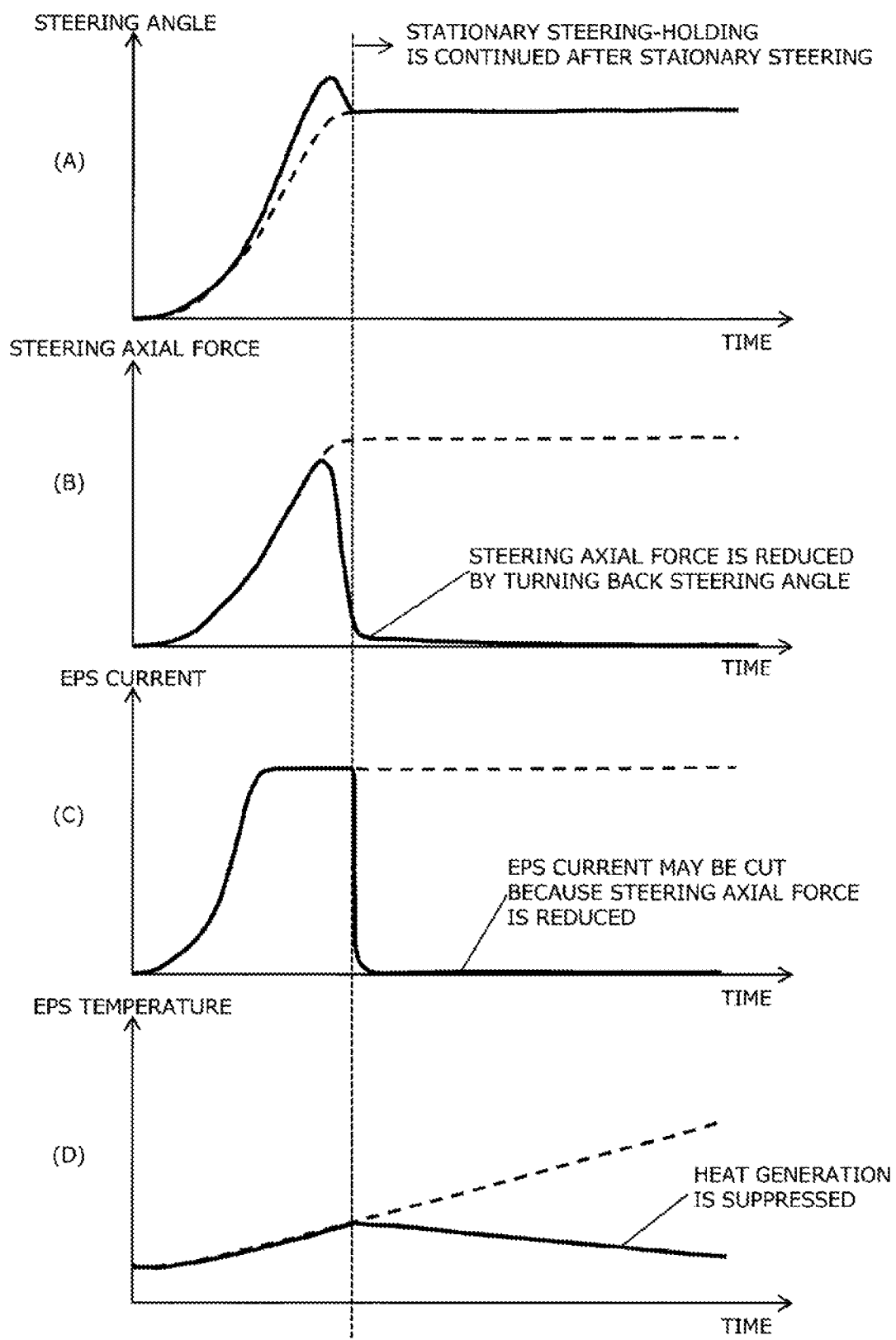
FIG. 4 is a conceptual diagram for explaining steering control according to the first embodiment.

The vehicle control system 10 according to the first embodiment solves the problem shown in the comparative example by the following steering control. FIG. 4 is a conceptual diagram for explaining steering control according to the first embodiment. The dashed line in this figure shows the time chart of the steering control of the comparative example shown in FIG. 3. As shown in the time chart (A) of FIG. 4, in the vehicle control system 10 of the first embodiment, in the case where the stationary steering-holding is continued after the stationary steering, the steering-holding is continued after the steering return processing for intentionally turning back the steering angle is performed. A specific method of the steering return process will be described later. When the steering return process is performed, as shown in the time chart (B) of FIG. 4, since the road surface reaction force and the torsion of the wheel which are received by the wheel (tire) are reduced, the steering axial force is greatly reduced.

In a state in which the steering axial force is lowered, even if the EPS current is lowered, the steering angle is not returned by the reaction force. Therefore, in the vehicle control system 10 of the first embodiment, as shown in the time chart (C) of FIG. 4, the energization suppression process is performed in which the EPS current is reduced from that before the steering-holding during the stationary steering-holding after the steering return process. As a result, as shown in the time chart (D) of FIG. 4, since the increase of the EPS temperature is suppressed, it is possible to perform the stationary steering-holding for a long time after the stationary steering and to increase the number of times of the stationary steering.

1-3. Specific Method of Steering Return Process

Figure 5:
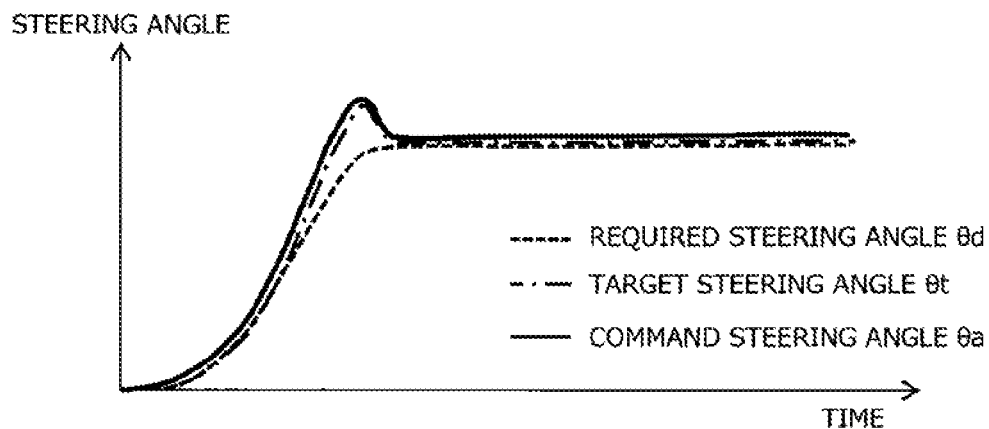
FIG. 5 is a time chart showing a first example of a steering return process.

FIG. 5 is a time chart showing the first example of the steering return process. In this time chart, the dashed line indicates a change in the required steering angle θd obtained from the detection signal of the steering angle sensor 62, the dash-dot line indicates a change in the target steering angle θt calculated in the controller 100, and the solid line indicates a change in the command steering angle θa which is a control amount instructed to the EPS device 40.

In the first example of the steering return process shown in this chart, when the steering angle is held, the controller 100 temporarily calculates a large target steering angle θt with respect to the required steering angle θd. Specifically, when the absolute value of the amount of change of the required steering angle θd becomes equal to or less than the predetermined determination threshold, the controller 100 temporarily overshoots the target steering angle θt corresponding to the required steering angle θd, and then returns the target steering angle θt to the required steering angle θd. As a result, the actual steering angle returns to the required steering angle θd after overshooting from the required steering angle θd. Here, the determination threshold may be any value that can determine that the steering angle is immediately before or after the steering angle is held. Further, there is no limitation on the overshoot amount here. According to such a steering return process, the steering angle may be held at the required steering angle after the steering angle is turned back.

Figure 6:
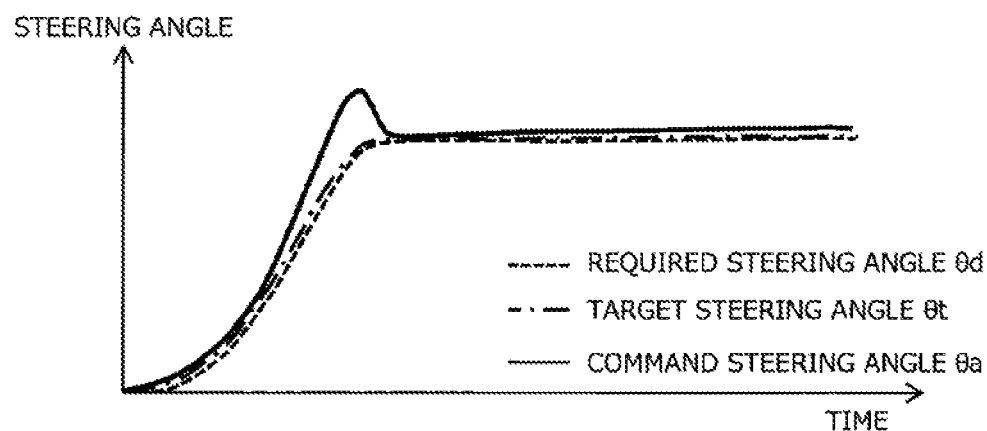
FIG. 6 is a time chart showing a second example of the steering return process.

FIG. 6 is a time chart showing the second example of the steering return process. The required steering angle θd, the target steering angle θt, and the command steering angle θa in this time chart are the same as the definition of the line types shown in FIG. 5. In the second example of the steering return process shown in this time chart, when the steering angle is maintained, the controller 100 realizes the turning back operation of the steering angle by changing the response characteristic of the electric motor 42 of the EPS device 40. Specifically, the controller 100 calculates a target steering angle θt corresponding to the required steering angle θd. Then, when the absolute value of the amount of change of the required steering angle θd becomes equal to or less than the predetermined determination threshold value, the controller 100 adjusts the gain with respect to the target steering angle θt to temporarily overshoot the command steering angle θa with respect to the target steering angle θt, and then returns the command steering angle θa to the target steering angle θt. As a result, the actual steering angle returns to the required steering angle θd after overshooting from the required steering angle θd. Here, the determination threshold may be any value that can determine that the steering angle is immediately before or after the steering angle is held, similarly to the processing of the first example described above. Further, there is no limitation on the overshoot amount here. According to such steering return process, it is possible to hold the steering angle at the required steering angle after the steering angle is turned back without performing a special calculation of the target steering angle θt.

Figure 7:
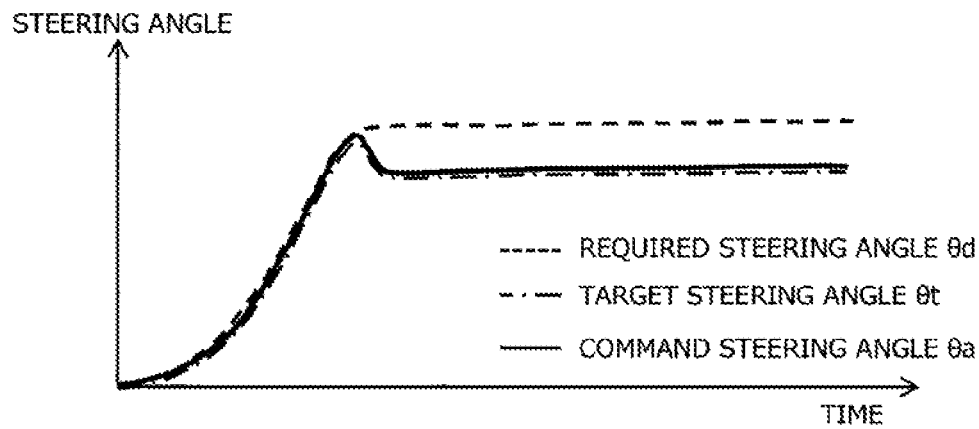
FIG. 7 is a time chart showing a third example of the steering return process.

FIG. 7 is a time chart showing a third example of the steering return process. The required steering angle θd, the target steering angle θt, and the command steering angle θa in this time chart are the same as the definition of the line types shown in FIG. 5. In the third example of the steering return process shown in this time chart, when the steering angle is held, the controller 100 calculates a small target steering angle θt with respect to the required steering angle θd. Specifically, when the absolute value of the amount of change of the required steering angle θd becomes equal to or less than the predetermined determination threshold, the controller 100 lowers the target steering angle θt corresponding to the required steering angle θd by a predetermined amount and then holds the target steering angle θt. As a result, the actual steering angle is hold after being turned back in the opposite direction in the process of approaching the required steering angle θd. Note that the determination threshold here may be any value as long as it can be determined that the steering angle is held immediately before or when the steering angle is held. In addition, the predetermined amount is not limited here. According to such steering return process, it is possible to hold the steering angle in the vicinity of the required steering angle after the steering angle is turned back.

1-4. Specific Process of Steering Control According to First Embodiment

Figure 8:
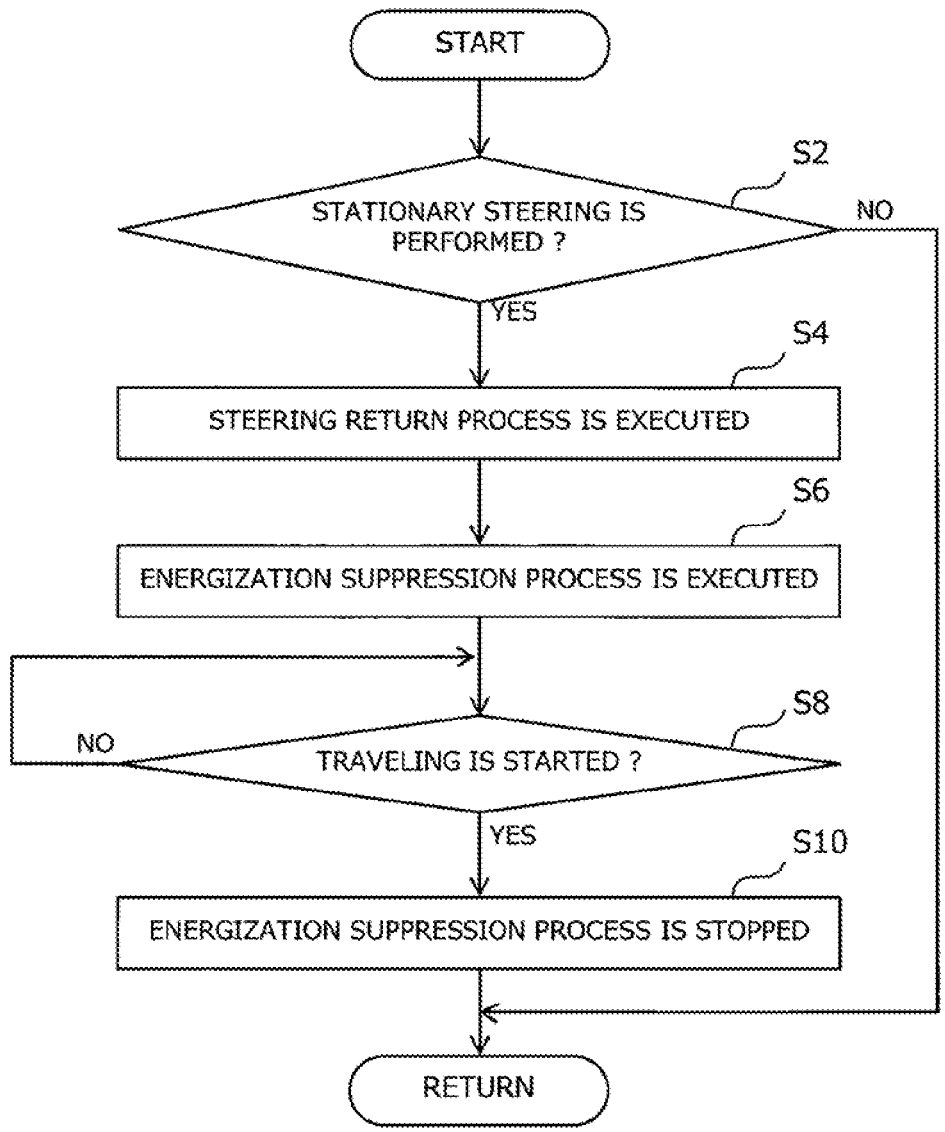
FIG. 8 is a flowchart showing a routine of steering control executed in the first embodiment.

Next, a specific process of steering control executed in the vehicle control system according to the first embodiment having the above-described configuration will be described with reference to a flowchart. FIG. 8 is a flowchart showing a routine of steering control executed in the first embodiment. The routine shown in FIG. 8 is executed by the controller 100 when the steering angle of the vehicle 2 is being steered by the driver.

In the routine shown in FIG. 8, first, it is determined whether the stationary steering of the vehicle 2 is performed on the basis of the detection signals of the wheel speed sensor 64 and the steering angle sensor 62 in step S2. As a result, when it is determined that the stationary steering is not performed, it is determined that the heat generation of the EPS device 40 does not cause a problem, and the present routine is terminated. On the other hand, when it is determined in step S2 that the stationary steering is performed, the process proceeds to the next step.

In the next step S4, the steering return process for decreasing the steering axial force is executed. Here, specifically, any one of the first to third examples of the steering return process described above is executed. When the process of step S4 is completed, the process proceeds to the next step.

In the next step S6, the energization suppression process is executed. Specifically, the EPS current supplied to the electric motor 42 of the EPS device 40 is reduced to zero. When the process of step S6 is completed, the process proceeds to the next step.

In the next step S8, it is determined whether the traveling of the vehicle 2 is started during the energization suppression process based on the detection signal of the wheel speed sensor 64. As a result, when the vehicle 2 is still stopped, the process of step S8 is repeatedly executed. On the other hand, when the traveling of the vehicle 2 is started, the process proceeds to the next step. In the next step S10, the energization suppression process is stopped, and the energization of the electric motor 42 of the EPS device 40 is restarted. When the process of step S10 is completed, the present routine is terminated.

As described above, according to the steering control of the vehicle control system 10 of the first embodiment, the steering axial force may be reduced by the steering return process in the case where the steering-holding after the stationary steering is continued. Thus, since the EPS current may be reduced while holding the steering angle, it is possible to suppress the heat generation of the EPS device 40.

1-5. Modified Examples of Vehicle Control System According to First Embodiment

The vehicle control system according to the first embodiment may be applied with a configuration modified as described below.

The steering control for executing the steering return process and the energization suppression process is not limited to the time of the stationary steering. That is, the road surface reaction force to which the wheel (tire) is subjected and the torsion of the wheel (tire) occur even during the moving steering of the vehicle 2. For this reason, in the steering control of the first embodiment, the steering return process may be executed even at the time of moving steering, and the energization suppression process may be executed during the subsequent stoppage of the vehicle 2. In this case, in the routine shown in FIG. 8, it is determined whether the moving steering of the vehicle 2 is performed in step S2, it is determined whether the vehicle 2 is stopped before the processing in step S6, and the energization suppression process in step S6 is executed only when the vehicle 2 is stopped. As a result, the steering axial force generated during the moving steering may be reduced, so that the heat generation of the EPS device 40 during the subsequent stoppage of the vehicle 2 may be suppressed.

The EPS current supplied to the electric motor 42 in the power supply suppression process is not limited to zero. That is, in the energization suppression process, the current value is not limited as long as the EPS current is reduced to a value lower than that before the stationary steering-holding.

In the steering control according to the first embodiment, it may be determined whether the process of step S6 is to be executed in accordance with the temperature of the EPS device 40. That is, when the temperature of the EPS device 40 is kept low, the necessity of performing the energization suppression process is lowered. Therefore, in the routine shown in FIG. 8, for example, before the process of step S6, a temperature detection process for detecting the temperature of the EPS device 40 and a determination process for determining whether the detected temperature is higher than a predetermined determination temperature are performed. Then, only when the temperature of the EPS device 40 is equal to or higher than the determination temperature, the energization suppression process of step S6 may be performed, and when the temperature of the EPS device 40 is lower than the determination temperature or lower, the inhibition process of inhibiting the execution of the energization suppression process may be performed. This makes it possible to suppress the execution of the current supply suppression process when the necessity of the current supply suppression process is low. This also applies to the vehicle control system of the second embodiment, which will be described later.

Second Embodiment 2-1. Features of Second Embodiment

The vehicle control system of the second embodiment is characterized in that the above-described steering control is performed at least during the automated driving in which the steering of the vehicle 2 is performed automatically. The configuration of the vehicle control system of the second embodiment is the same as that of the vehicle control system 10 of the first embodiment. The basic concept of steering control is the same as that of the first embodiment. Descriptions overlapping with those of first embodiment are omitted as appropriate.

In an automatic parking system that parks a vehicle using automated driving, it is sometimes required to enter or leave a narrow space. For this reason, in the automatic parking using the automatic parking system, smooth parking is expected by actively utilizing the stationary steering and the subsequent stationary steering-holding. Also, in an automated driving system that performs automated driving of a vehicle, it is conceivable to perform a stationary steering operation when performing a U-turn, a small turn, or the like. Therefore, when such automatic parking or automated driving uses a lot of stationary steering, the heat generation of the EPS device 40 becomes a problem as in the case of steering by the driver. Incidentally, such a problem of heat generation of the EPS device 40 may occur not only in the stationary steering but also in the moving steering at a low speed, for example.

Here, in the automated driving system, a planned route for moving the vehicle 2 to the target position is generated. For this reason, in the automated driving system, it is possible to grasp in advance a state of performing the stationary steering-holding after the stationary steering, for example, a stop during the shift switching operation.

Therefore, the vehicle control system according to the second embodiment predicts the execution of the stationary steering based on the planned route. Then, the vehicle control system performs the steering return process and the energization suppression process when the stationary steering is executed. According to such control, it is possible to effectively suppress an increase in the EPS temperature during the automated driving.

2-2. Specific Process of Steering Control According to Second Embodiment

Figure 9:
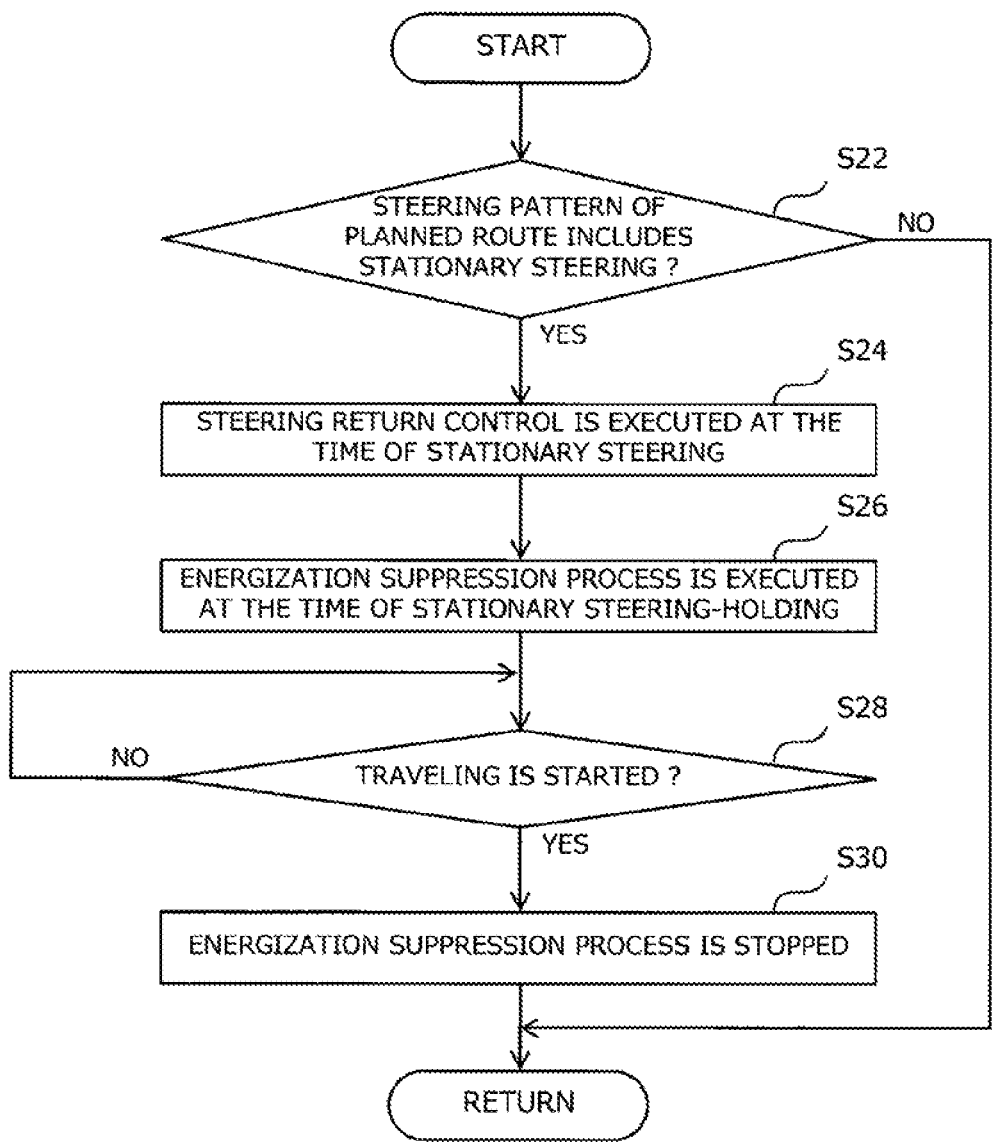
FIG. 9 is a flowchart showing a routine of steering control executed in a second embodiment.

Next, a specific process of steering control executed in the vehicle control system according to the second embodiment having the above-described configuration will be described with reference to a flowchart. FIG. 9 is a flowchart showing a steering control routine executed in the second embodiment. Note that the routine shown in FIG. 9 is executed by the controller 100 at least during automated driving in which steering is performed automatically.

In the routine shown in FIG. 9, it is determined whether there is a plan to perform the stationary steering based on the planned route in step S22. The driving support system ECU 52 generates a planned route for moving the vehicle 2 to the target position. Here, based on the planned route sent from the driving support system ECU 52, it is determined whether the steering pattern of the planned route includes the stationary steering. As a result, when it is determined that the stationary steering is not included, the routine is terminated, and when it is determined that the stationary steering is included, the process proceeds to the next step.

In the next step S24, the steering return control is executed at the time of the stationary steering during the automated driving. The controller 100 grasps the timing at which the stationary steering is performed. Here, at the timing of the grasped stationary steering, the steering return processing similar to that in step S4 is executed. When the process of step S24 is completed, the process proceeds to the next step.

In the next step S26, the energization suppression process is executed. Specifically, the EPS current supplied to the electric motor 42 of the EPS device 40 is reduced to zero at the time of stationary steering-holding after the steering return process. When the process of step S26 is completed, the process proceeds to the next step.

In the next step S28, it is determined whether the traveling of the vehicle 2 is started. As a result, when the vehicle 2 is still stopped, the process of step S28 is repeatedly executed. On the other hand, when the traveling of the vehicle 2 is started, the process proceeds to the next step. In the next step S30, the energization suppression process is stopped, and the energization of the electric motor 42 of the EPS device 40 is restarted. When the process of step S30 is completed, this routine is terminated.

As described above, according to the steering control of the vehicle control system 10 of the second embodiment, the steering axial force may be reduced by the steering return process in the stationary steering during the automated driving. Thus, since the EPS current may be reduced while holding the steering angle, it is possible to suppress heat generation of the EPS device 40 during automated driving.

Modified Examples of Vehicle Control System According to Second Embodiment

The vehicle control system according to the second embodiment may be applied with a configuration modified as described below.

In the process of step S24, the steering return process is executed at the timing at which the stationary steering is performed, but the steering pattern of the steering return process may be incorporated in advance in the planned route of the timing. The stationary steering-holding after the steering return process may also be incorporated in advance in the steering pattern of the planned route.

In step S22, it is determined whether the stationary steering is executed based on the planned route, but also during the automated driving, it may be determined whether the stationary steering of the vehicle 2 is performed based on the detection signals of the wheel speed sensor 64 and the steering angle sensor 62, similarly to the process in step S2.

The steering control for executing the steering return process and the energization suppression process during the automated driving is not limited to the stationary steering. That is, as described above, the road surface reaction force applied to the wheel and the torsion of the wheel occur even during the moving steering of the vehicle 2. Therefore, in the steering control of the second embodiment, the steering return process may be executed even at the time of moving steering, and the energization suppression process may be executed during the subsequent stationary steering-holding of the vehicle 2. In this case, in the routine shown in FIG. 9, the planned route along which the moving steering of the vehicle 2 is performed is determined in step S22, whether the vehicle 2 is in the stationary steering-holding state is determined before the process of step S26, and the energization suppression process of step S26 is executed only when the vehicle 2 is in the stationary steering-holding state. As a result, it is possible to reduce the steering axial force generated during the moving steering by the automated driving, and thus it is possible to suppress the heat generation of the EPS device 40 during the subsequent stationary steering-holding of the vehicle 2.

What is claimed is:

1. A vehicle control system for a vehicle mounted with an electric power steering apparatus having an electric motor driven to control a steering angle of wheels, the vehicle control system comprising a controller configured to perform steering control for controlling an energization of the electric motor to control the steering angle of the wheels,
   wherein the controller is configured to:
   when the wheels are held after being steered by a specific steering in the steering control, perform a steering return process in which the wheels are turned back and held in a direction opposite to a steering direction of the specific steering, and
   during a stationary steering-holding in which the steering angle is held and the vehicle is stopped, perform an energization suppression process for reducing energization to the electric motor to be smaller than the energization before the stationary steering-holding,
   wherein the steering control is configured to control energization of the electric motor to bring an actual steering angle of the wheels closer to a required steering angle, and
   wherein the steering return process is configured to control energization of the electric motor so that the actual steering angle returns to the required steering angle after overshooting the required steering angle in the process of holding the actual steering angle at the required steering angle.

2. The vehicle control system according to claim 1, wherein the specific steering is a stationary steering that performs steering in a state in which the vehicle is stopped.

3. The vehicle control system according to claim 1, wherein the controller is configured to stop the energization suppression process when the vehicle starts traveling during the energization suppression process.

4. The vehicle control system according to claim 1,
   wherein the controller is configured to execute a process of calculating the required steering angle from the steering operation amount of the driver.

5. The vehicle control system according to claim 1,
   wherein the controller is configured to execute a process of,
   acquiring a planned route to a target position, and
   calculating a steering angle for the vehicle to follow the planned route as the required steering angle.

6. The vehicle control system according to claim 1, wherein the controller is configured to stop the energization suppression process when the vehicle starts traveling during the energization suppression process.

7. A vehicle control system for a vehicle mounted with an electric power steering apparatus having an electric motor driven to control a steering angle of wheels, the vehicle control system comprising a controller configured to perform steering control for controlling an energization of the electric motor to control the steering angle of the wheels,
   wherein the controller is configured to:
   when the wheels are held after being steered by a specific steering in the steering control, perform a steering return process in which the wheels are turned back and held in a direction opposite to a steering direction of the specific steering, and
   during a stationary steering-holding in which the steering angle is held and the vehicle is stopped, perform an energization suppression process for reducing energization to the electric motor to be smaller than the energization before the stationary steering-holding,
   wherein the steering control is configured to control the energization of the electric motor to bring an actual steering angle of the wheel closer to a required steering angle, and
   wherein the steering return process is configured to control the energization of the electric motor so that the wheels are turned back and held in a direction opposite to the steering direction toward the required steering angle in the process of bringing the actual steering angle closer to the required steering angle.

* * * * *